Dec. 18, 1934.     H. A. ROSE     1,984,994
McLEOD GAUGE
Filed Sept. 30, 1932
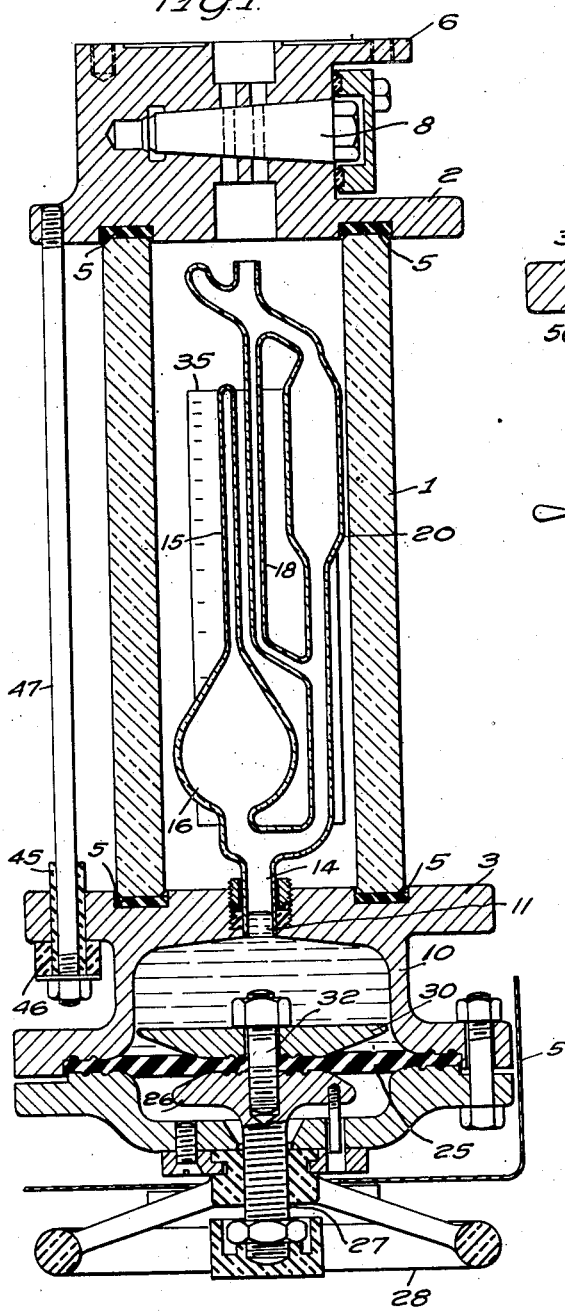
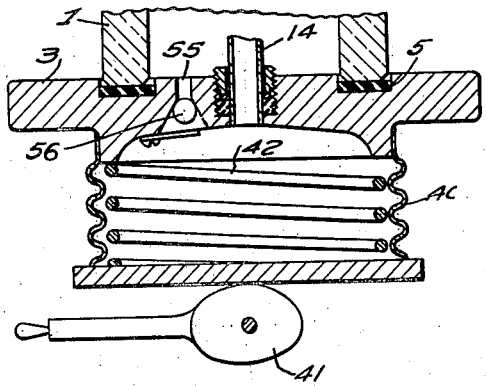
WITNESSES:
INVENTOR
Herbert A. Rose.
BY
ATTORNEY Patented Dec. 18, 1934

1,984,994

UNITED STATES PATENT OFFICE 1,984,994

McLEOD GAUGE

Herbert A. Rose, Wilkinsburg, Pa., assignor to Westinghouse Electric & Manufacturing Company, East Pittsburgh, Pa., a corporation of Pennsylvania Application September 30, 1932, Serial No. 635,529

10 Claims. (Cl. 73—31)

My invention relates to a measuring device for measuring low gas pressures and particularly to a gauge of the McLeod type.

In the measuring of low pressures or in the measuring of the non-condensing gases in vapor electric devices, such as mercury arc rectifiers, the most suitable gauges have been of the type known as McLeod gauges. However, McLeod gauges, as used heretofore, have possessed a serious disadvantage in that it is necessary to provide them with barometric column seals. The necessity for barometric seals has not only made the devices very awkward because of size and shape but also very fragile. The necessity for barometric seals coupled with the desire for the smallest possible size has led to the use of heavy liquids such as mercury for the sealing and compressing medium.

In the gauge, according to my invention, the unhandy barometric column has been dispensed with by providing a small closed chamber for containing the compressing fluid. Suitable means are provided for changing the volume of the fluid chamber independently of the pressure surrounding the chamber.

Any suitable compressing fluid may be used but for many reasons it is desirable to use a fluid lighter than mercury such as gallium, butyl phthalate or other suitable liquids having low vapor pressures.

Other objects and advantages will be apparent from the following detailed description taken in conjunction with the accompanying drawing, in which Figure 1 is a sectional elevation of a pressure gauge according to my invention.

Fig. 2 is a similar section showing a modified liquid chamber.

The apparatus, according to my invention, comprises a vacuum chamber preferably composed of a transparent cylinder 1 such as glass having metal ends 2 and 3 firmly clamped thereto. Suitable sealing gaskets 5 are provided between the cylindrical side walls and the end plates. The top plate 2 of the cylinder is preferably provided with a flange 6 for attachment to the vessel in which it is desired to measure the pressure.

A suitable valve 8 is provided for cutting off communication between the gauge and the pressure vessel or for maintaining the gauge in an evacuated condition. A fluid containing chamber 10 is attached in any desired manner to the lower end 3 of the vacuum chamber. A suitable communicating passage 11 is provided between the liquid chamber and the vacuum chamber.

The gauge proper of my device is provided with a packing stem 14 which is rigidly secured in the communicating passage 11 so that liquid will pass from the liquid chamber 10 through the packing stem 14 into the gauge. An upwardly extending capillary tube 15 having a closed top is attached to the packing stem 14. If desired, this capillary tube may be provided intermediate its length with a suitable enlargement 16 in order to increase the volume of the tube. A second capillary tube 18 is attached to the packing tube 14 and extends in substantially parallel arrangement with the closed capillary tube 15. This second capillary tube, however, is open at the top to the pressure to be measured.

In order to secure rapidity and ease in operating the gauge, I prefer to provide a by-pass tube 20 of relatively large diameter around the open capillary tube 18.

In the embodiment shown in Fig. 1, the liquid chamber 10 is closed at one end with a suitable flexible diaphragm 25. Upon the outside of this diaphragm is a pressing plate 26 for pushing the diaphragm inward for reducing the volume of the liquid chamber 10. Suitable operating means, such as a screw 27 and hand wheel 28 are provided for pressing the diaphragm upward. For distending the diaphragm against atmospheric pressure when the pressure plate is withdrawn, I have provided a plate 30 inside of the diaphragm and mechanically attached to the pressing plate 26 as by the screw 32 so that when the pressing plate 26 is withdrawn, the diaphragm 25 will also be retracted.

In the operation of my device, the gauge will be attached to the chamber such as a mercury arc rectifier in which I desire to measure the pressure. The valve 8 will then be opened allowing the pressure in the vessel to be communicated to the vacuum chamber of the gauge. The diaphragm 25 is then drawn downward to withdraw the liquid from the gauge proper and allow a quantity of the gas to be measured to enter the closed capillary tube. The chamber is then contracted to force liquid into the parallel tubes to entrap a given volume of gas in the closed tube. The liquid is forced into the gauge until it rises in the open tube to any desired or predetermined level. A suitable scale 35 is provided behind the capillary tubes to enable the operator to ascertain the volume of the gas compressed in the closed capillary tube. If desired, this scale may be graduated to read the pressure directly in any desired units.

In the modification shown in Fig. 2, the rigid chamber and the compressing diaphragm have been replaced by a collapsible chamber 40 such as a sylphon bellows. Suitable operating mechanism such as the cam 41 is provided for pressing the liquid from the chamber 40 into the gauge and suitable resilient mechanism 42 is provided for distending the bellows against the outside pressure.

When the gauge is used for measuring the non-condensing gases in a mercury arc rectifier, it is sometimes desirable to provide insulating means such as the sleeves 45 and washers 46 on the bolts 47 securing the end plates 2 and 3 to the vacuum chamber 1 so that the liquid chamber 10 and its operating mechanism is substantially insulated from the potential of the rectifying device. However, when the device is attached to a rectifier operating at high voltages, the pressure in the vacuum chamber 1 may be low enough to permit a glow discharge between the opposite end plates 2 and 3. For this reason I provide suitable insulation 50 around the chamber 10 and make the operating mechanism 28 of insulating material so that the operator will at all times be protected from excess potentials.

Although any suitable liquid, such as mercury can be used in my device, I prefer to use a liquid of less weight such as gallium, butyl phthalate or other suitable liquids having suitable vapor pressure.

The lighter weight liquids are preferred principally because of the increased scale readings or deflections which are obtained by them, and because, for a given scale reading, the trapped gas sample will be compressed to a lesser degree, reducing or eliminating the hazard of condensation of such gases as water vapor.

In the operation of gauges the compressing fluid is frequently forced too high in the gauge tubes so that a portion spills out into the vacuum chamber. I provide a passage 55 equipped with a suitable check valve 56 to allow the compressing fluid to return to the liquid chamber.

While I have shown and described specific embodiments of my invention, it is apparent that changes and modifications can be made therein without departing from the spirit and scope of my invention. I desire, therefore, that only such limitations shall be imposed as are embodied in the accompanying claims or as may be necessitated by the prior art.

I claim as my invention:

1. A gauge for measuring the pressure of the non-condensing gases in a vapor-electric device comprising a chamber adapted for connection to the vapor electric device, a second chamber sealed against the pressure outside the gauge, there being a passage between said chambers, a packing stem secured in said passage, a capillary tube connected to said stem, a second tube connected to said stem, said second tube opening into the first-mentioned chamber, a low vapor pressure liquid in said second chamber and means for decreasing or increasing the volume of said second chamber for forcing the liquid into or withdrawing the liquid from the tubes.

2. A gauge for measuring the pressure of the non-condensing gases in a vapor-electric device comprising a chamber adapted for connection to the vapor electric device, a second chamber sealed against outside pressure, there being a passage between said chambers, a packing stem secured in said passage, a capillary tube connected to said stem, a second tube connected to said stem, said second tube opening into the first mentioned chamber, a low vapor pressure liquid in said second chamber and means for decreasing or increasing the volume of said second chamber for pressing the liquid into or withdrawing the liquid out of the tubes, and insulating means between the second chamber and the vapor electric device.

3. A gauge for low pressure comprising a gas tight chamber communicating with the pressure to be measured, an upstanding capillary tube in said chamber, said capillary tube being closed at the top, a packing stem communicating with the capillary tube, a tube communicating with the packing stem, said tube extending in substantial parallel relation with said capillary tube and having an opening to the chamber, a second chamber sealed against atmosphere, said chamber communicating with the packing stem, a liquid in said chamber having a low vapor pressure and means for changing the volume of said chamber for forcing a portion of the liquid into the parallel tubes.

4. A gauge for low pressure comprising a gas tight chamber communicating with the pressure to be measured, an upstanding capillary tube in said chamber, said capillary tube being closed at the top, a packing stem communicating with the capillary tube, a tube communicating with the packing stem, said tube extending in substantial parallel relation with said capillary tube and having an opening to the chamber, a second chamber sealed against atmosphere, said chamber communicating with the packing stem, a liquid in said chamber having a low vapor pressure and means for changing the volume of said chamber for forcing a portion of the liquid into the parallel tubes, and means for restoring the volume of said chamber.

5. A pressure gauge for a vapor electric device comprising a plate adapted for connection to the vapor electric device, a second plate insulated from said first mentioned plate, a gauge element between said plates, a liquid chamber attached to said second plate and in communication with said gauge element, means for varying the volume of the liquid chamber and an insulating jacket for said insulated plate.

6. A gauge for measuring the non-condensing gases in a vapor electric device comprising an element for attachment to the device, a second element insulated from the first mentioned element, a glass tube between said elements forming a chamber communicating with the device, a gauge element in said chamber, an operating mechanism for said gauge element and means for insulating said operating mechanism.

7. A gauge for measuring the non-condensing gases in a vapor electric device comprising an element for attachment to the device, a second element insulated from the first mentioned element, a glass tube between said elements forming a chamber communicating with the device, a gauge element in said chamber, a sealed liquid chamber in communication with said gauge element, means for varying the volume of said chamber, and an insulating shield about said chamber.

8. A gauge of the McLeod type comprising a head having a passage for connection to the pressure to be measured, a valve in said head for closing the passage, a chamber secured to said head, a gauge element in said chamber, a liquid chamber communicating with said gauge element, mechanism for forcing liquid from the liquid chamber into the gauge element and an insulated handle for said mechanism.

9. A gauge of the McLeod type comprising a head having a passage for connection to the pressure to be measured, a valve in said head for closing the passage, a chamber secured to said head, a gauge element in said chamber, a liquid chamber communicating with said gauge element, mechanism for forcing liquid from the chamber into the gauge element and an insulated handle for said mechanism, and an insulating shield about said liquid chamber.

10. A gauge for low pressure comprising a gas tight chamber communicating with the pressure to be measured, an upstanding capillary tube in said chamber, said capillary tube being closed at the top, a packing stem communicating with the capillary tube, a tube communicating with the packing stem, said tube extending in substantial parallel relation with said capillary tube and having an opening to the chamber, a second chamber sealed against atmosphere, said chamber communicating with the packing stem, a liquid in said chamber having a low vapor pressure and means for changing the volume of said chamber for forcing a portion of the liquid into the parallel tubes, a second passage between said chambers and a check valve for allowing liquids to flow from the vacuum chamber to the liquid chamber.

HERBERT A. ROSE.